(12) United States Patent
Conger et al.

(10) Patent No.: US 8,165,340 B2
(45) Date of Patent: Apr. 24, 2012

(54) METHODS FOR GAS DETECTION USING STATIONARY HYPERSPECTRAL IMAGING SENSORS

(75) Inventors: James L. Conger, San Ramon, CA (US); John R. Henderson, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 335 days.

(21) Appl. No.: 12/575,269

(22) Filed: Oct. 7, 2009

(65) Prior Publication Data

US 2011/0081040 A1    Apr. 7, 2011

(51) Int. Cl.
*G06K 9/00*    (2006.01)
(52) U.S. Cl. ..... 382/100; 356/432; 356/437; 250/336.1; 382/181; 382/276
(58) Field of Classification Search .......... 382/100–317; 356/432, 437; 250/336.1–353
See application file for complete search history.

(56) References Cited

U.S. PATENT DOCUMENTS

| | | | | | |
|---|---|---|---|---|---|
| 5,471,056 | A | * | 11/1995 | Prelat | 250/253 |
| 6,008,492 | A | * | 12/1999 | Slater et al. | 250/334 |
| 6,075,891 | A | * | 6/2000 | Burman | 382/191 |
| 6,587,575 | B1 | * | 7/2003 | Windham et al. | 382/110 |
| 6,665,438 | B1 | * | 12/2003 | Lin | 382/191 |
| 6,687,620 | B1 | * | 2/2004 | Haaland et al. | 702/22 |
| 6,842,702 | B2 | * | 1/2005 | Haaland et al. | 702/18 |
| 6,853,452 | B1 | * | 2/2005 | Laufer | 356/436 |
| 6,940,999 | B2 | * | 9/2005 | Lin | 382/103 |
| 7,796,833 | B2 | * | 9/2010 | Polonskiy et al. | 382/274 |
| 2006/0023948 | A1 | * | 2/2006 | Palmadesso et al. | 382/191 |
| 2011/0044495 | A1 | * | 2/2011 | Wolowelsky et al. | 382/100 |

OTHER PUBLICATIONS

Alan D. Stocker, "HIRIS Baseline Algorithms fir Level 3 Analysis Version 2.0" Lawrence Livermore National Laboratory, Sep. 12, 2000, p. 1-33.
McVey et al., "Distribution of Chemical False Positives for Hyperspectral Image Data" Los Alamos National Laboratory, LA-CP-02-521. p. 1-47, 2002.

* cited by examiner

*Primary Examiner* — Manav Seth
(74) *Attorney, Agent, or Firm* — Eddie E. Scott (57) ABSTRACT

According to one embodiment, a method comprises producing a first hyperspectral imaging (HSI) data cube of a location at a first time using data from a HSI sensor; producing a second HSI data cube of the same location at a second time using data from the HSI sensor; subtracting on a pixel-by-pixel basis the second HSI data cube from the first HSI data cube to produce a raw difference cube; calibrating the raw difference cube to produce a calibrated raw difference cube; selecting at least one desired spectral band based on a gas of interest; producing a detection image based on the at least one selected spectral band and the calibrated raw difference cube; examining the detection image to determine presence of the gas of interest; and outputting a result of the examination. Other methods, systems, and computer program products for detecting the presence of a gas are also described.

24 Claims, 5 Drawing Sheets

METHODS FOR GAS DETECTION USING STATIONARY HYPERSPECTRAL IMAGING SENSORS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to hyperspectral gas plume analysis, and more particularly, to systems and methods for determining gas types using hyperspectral imaging data.

BACKGROUND

Long wave infrared (LWIR) hyperspectral imaging (HSI) data can be used for gas plume identification. This technology, although useful for identifying gas plumes without taking direct measurements from the source area, has a few problems associated with the efficient use of the technology. One of these problems is that gas identifications may require vast amounts of computer processing power in order to analyze and identify chemical gases present in the gas plumes.

HSI data includes many data 'cubes' stored at desired intervals. Each cube may include multiple images of the same location at different wavelengths. HSI data exploitation algorithms in common use were developed for airborne sensor platforms. These algorithms use a covariance matrix as a model of the scene background. The inverse of the scene covariance matrix can be used to suppress background features, leaving spectral anomalies such as gas plumes exposed for detection. These methods are effective, but require extensive calculations, typically done with double-precision floating point numbers. The computational power required to perform the computations is typically not a problem with airborne HSI sensors. Ground-based HSI-based detectors operating from batteries or other limited power supplies do not have the power budget available to allow for gas detection with conventionally known and used algorithms and systems.

Therefore, a system and method of determining the presence of gases in a gas plume by analyzing HSI data using a much smaller number of computations would be desirable for ground-based applications with limited power capabilities. It would also be desirable to have low power detection systems and methods that allow power-limited HSI-based detectors to provide rapid results, and also allow compression of the sensor data by several orders of magnitude over other conventional methods. However, such approaches have heretofore been inconceivable.

SUMMARY

According to one embodiment, a method comprises producing a first hyperspectral imaging (HSI) data cube of a location at a first time using data from a HSI sensor; producing a second HSI data cube of the same location at a second time using data from the HSI sensor; subtracting on a pixel-by-pixel basis the second HSI data cube from the first HSI data cube to produce a raw difference cube; calibrating the raw difference cube to produce a calibrated raw difference cube; selecting at least one desired spectral band based on a gas of interest; producing a detection image based on the at least one selected spectral band and the calibrated raw difference cube; examining the detection image to determine presence of the gas of interest; and outputting a result of the examination.

In another embodiment, a computer program product for detecting the presence of a gas of interest comprises a computer readable memory having computer readable program code stored therein. The computer readable program code comprises computer readable program code for: producing a first hyperspectral imaging (HSI) data cube of a location at a first time using data from a HSI sensor; producing a second HSI data cube of the same location at a second time using data from the HSI sensor; subtracting on a pixel-by-pixel basis the second HSI data cube from the first HSI data cube to produce a raw difference cube; calibrating the raw difference cube to produce a calibrated raw difference cube; selecting at least one desired spectral band based on a gas of interest; producing a detection image based on the at least one selected spectral band and the calibrated raw difference cube; examining the detection image to determine presence of the gas of interest; and outputting a result of the examination.

According to yet another embodiment, a system comprises a receiving mechanism for receiving a first hyperspectral imaging (HSI) data cube of a location at a first time and a second HSI data cube of the same location at a second time created using data from a HSI sensor; a processor; and a memory operatively coupled to the processor. The processor comprises logic for subtracting on a pixel-by-pixel basis the second HSI data cube from the first HSI data cube to produce a raw difference cube; logic for calibrating the raw difference cube to produce a calibrated raw difference cube; logic for selecting at least one desired spectral band based on a gas of interest; logic for producing a detection image based on the at least one selected spectral band and the calibrated raw difference cube; logic for examining the detection image to determine presence of the gas of interest; and logic for outputting a result of the examination.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to one general embodiment, a method comprises producing a first hyperspectral imaging (HSI) data cube of a location at a first time using data from a HSI sensor; producing a second HSI data cube of the same location at a second time using data from the HSI sensor; subtracting on a pixel-by-pixel basis the second HSI data cube from the first HSI data cube to produce a raw difference cube; calibrating the raw difference cube to produce a calibrated raw difference cube; selecting at least one desired spectral band based on a gas of interest; producing a detection image based on the at least one selected spectral band and the calibrated raw difference cube; examining the detection image to determine presence of the gas of interest; and outputting a result of the examination.

According to another general embodiment, a computer program product for detecting the presence of a gas of interest comprises a computer readable memory having computer readable program code stored therein. The computer readable program code comprises computer readable program code for: producing a first hyperspectral imaging (HSI) data cube of a location at a first time using data from a HSI sensor; producing a second HSI data cube of the same location at a second time using data from the HSI sensor; subtracting on a pixel-by-pixel basis the second HSI data cube from the first HSI data cube to produce a raw difference cube; calibrating the raw difference cube to produce a calibrated raw difference cube; selecting at least one desired spectral band based on a gas of interest; producing a detection image based on the at least one selected spectral band and the calibrated raw difference cube; examining the detection image to determine presence of the gas of interest; and outputting a result of the examination.

According to yet another general embodiment, a system comprises a receiving mechanism for receiving a first hyperspectral imaging (HSI) data cube of a location at a first time and a second HSI data cube of the same location at a second time created using data from a HSI sensor; a processor; and a memory operatively coupled to the processor. The processor comprises logic for: subtracting on a pixel-by-pixel basis the second HSI data cube from the first HSI data cube to produce a raw difference cube; calibrating the raw difference cube to produce a calibrated raw difference cube; selecting at least one desired spectral band based on a gas of interest; producing a detection image based on the at least one selected spectral band and the calibrated raw difference cube; examining the detection image to determine presence of the gas of interest; and outputting a result of the examination.

Generally, gas detection works by finding portions of a scene (generated from HSI data, possibly captured by a HSI sensor) that are spectrally anomalous compared with the background (modeled from scene statistics). If the background is uniform, this approach works very well, which is more easily accomplished by having a stationary HSI sensor capturing the data over a period of time. If the scene contains spectrally complex materials (clutter), such as manmade objects, the background itself contains anomalies. If large libraries of spectral data are used to identify gases, then chemicals or gases within the spectral window of the sensor can be identified based on their spectral signatures.

Figure 1:
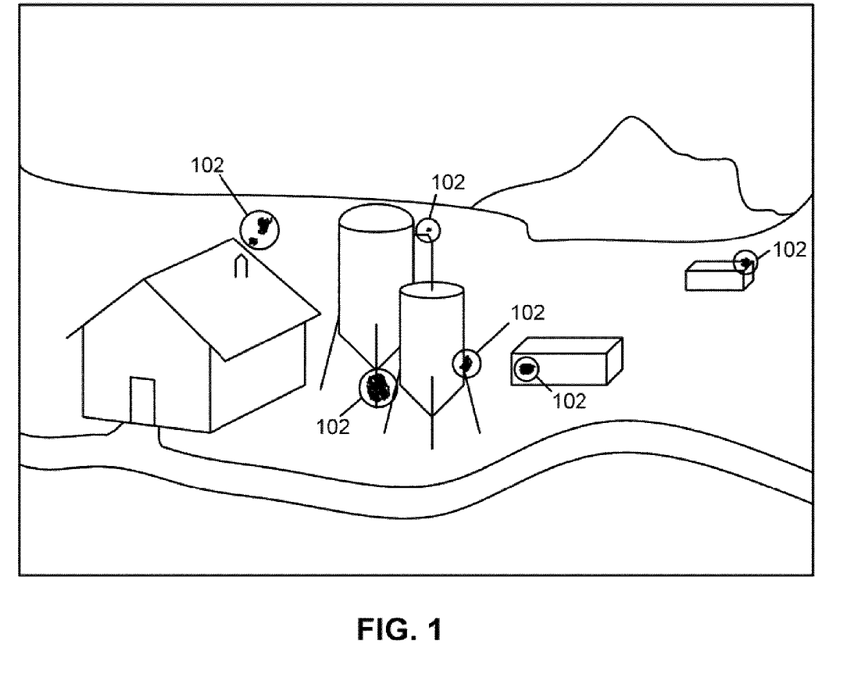
FIG. 1 is a schematic diagram of a detection image according to one embodiment.

Some of the examples described herein have been deliberately structured to show large amounts of clutter. For example, FIG. 1 shows a simplified rendering of a scene based on HSI data which is consistent with images produced from HSI data collected over a period of days. Of course, the time between a first data collection and a second data collection may be longer or shorter than a couple of days, such as a few seconds, a few minutes, a few hours, a week, etc. The locations of the gas signatures are marked as collections of lines forming darkened areas 102. This example shows what gas signatures may look like on a detection image.

Of course, how the detection image is shown can vary greatly. Some other ways of showing a detection image include a three dimensional representation highlighting the areas where a gas is detected, a printout which describes areas where a gas is detected (such as by grid with letters along the top of the scene and numbers along the side of the scene, e.g., gas at grid B52), a list of gases that are detected without indicating position, etc.

According to some embodiments, the HSI sensor is stationary so as to remove any detection errors associated with sensor movement. It has been observed that with a stationary sensor, subtraction of successive HSI image "cubes" results in suppression of background clutter while leaving moving objects, such as gas plumes, exposed. The output of the HSI difference cubes has been successfully processed using conventional (covariance matrix based) algorithms for gas detection.

According to one embodiment, background suppression from HSI image cube differencing is effective enough that further suppression of background features using a covariance matrix model is not required. Instead, the difference cube can be processed by subtracting spectral bands selected based on peaks (high absorption wavelengths) and valleys (low absorption wavelengths) in the spectrum of the chemical or gas of interest, which greatly reduces the number of computations that must be performed in order to arrive at usable information. Subtraction of carefully selected spectral bands provides a method of detecting specific spectra in the difference cube, but with a reduction in the number of calculations of at least three orders of magnitude, which is advantageous for several reasons. For example, using 6 spectral bands, a total of 24 operations (6 subtractions, 6 additions, 6 divisions) take place per pixel in order to arrive at a result; using a full matched filter, a total of about 35,000 operations (33,000 multiplications for covariance matrix, 3000 adds/pixel, 2000 multiplications for matrix inversion, 248 multiplications for matched filter creation) take place per pixel. There is a great many savings in number of operations by using methods and systems described herein.

One advantage of reduced computations, according to some embodiments, is that in limiting the number of calculations used to provide an analysis of whether a gas of interest is present at a location, the apparatus used for the calculations can use much less power, require less space, and may be mounted in the field for long term use with little to no maintenance over the lifetime of the device.

Another advantage is that a low power processor (such as a central processing unit (CPU), field-programmable gate array (FPGA), application specific integrated circuit (ASIC), etc.) may be used, allowing for the device to use considerably less power, which may be provided by batteries, solar power, wind power, or some other powering method which would not be limited by a conventional high power demanding processor used in conventional detection devices.

Figure 2:
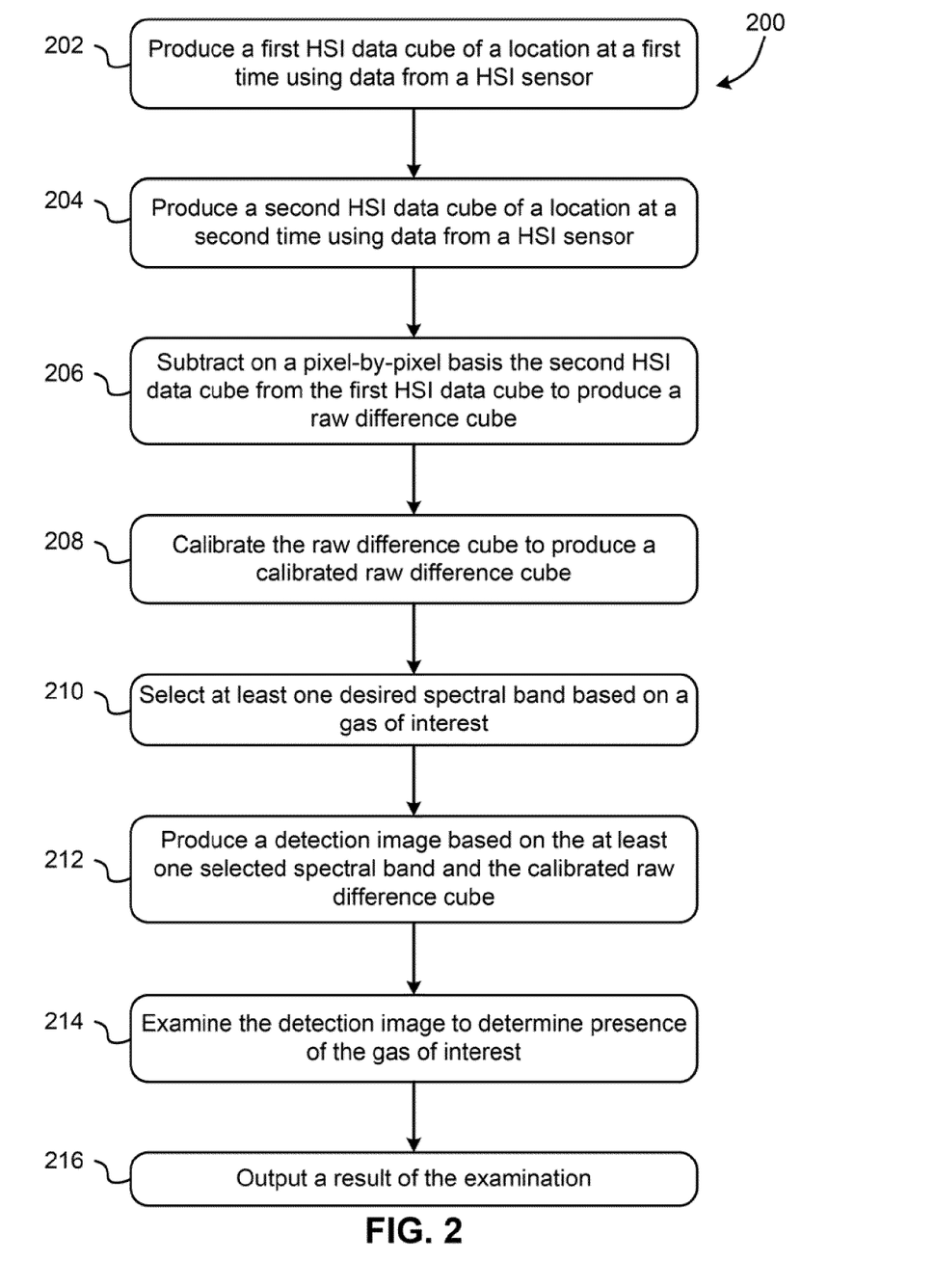
FIG. 2 is a flow chart of a method according to one embodiment.

With reference to FIG. 2, according to one embodiment, the following method 200 may be used to detect a desired gas. The method 200 may be executed in any desired environment, and more operations may be used in conjunction with the following described operations.

In operation 202, a first hyperspectral imaging (HSI) data cube is produced of a location at a first time using data from a HSI sensor. The HSI cube may be a collection of light absorptions (images) across a range of light wave frequencies of a location (what is visible to a HSI sensor). The number of images is dictated by how many wavelengths are being recorded. Generally, the light wavelengths which are recorded occur in the infrared region, but are not so limited.

In operation 204, a second HSI data cube is produced of the location at a second time using data from the HSI sensor. In a preferred embodiment, the HSI data cubes produced at the first time and at the second time are produced of a consistent location, e.g., if a HSI sensor is being used to collect the HSI data, the sensor is not moved or adjusted between production of the first and second HSI data cubes. In addition, in some embodiments, the second time is at a later time than the first time, e.g., the first and second time are separated by one or more seconds, one or more minutes, one or more hours, one or more days, etc.

In operation 206, the second HSI data cube is subtracted on a pixel-by-pixel basis from the first HSI data cube to produce a raw difference cube. For example, if the HSI data cube includes recordings at 50 different light wavelengths for 50 images per cube, and if each image of the HSI data cube includes 128×128 pixels, then there are a total of 16,384 pixels per image, and a total of 819,200 pixels for each cube. Therefore, if the second HSI data cube pixel values are subtracted from the first HSI data cube pixel values, there will be a total of 819,200 subtraction operations performed to produce a raw difference cube of the same size as the first and second HSI data cubes comprised of the result of each subtraction.

In operation 208, the raw difference cube is calibrated to produce a calibrated raw difference cube. According to some approaches, calibrating the raw difference cube may comprise dividing the raw difference cube on a pixel-by-pixel basis by a measured pixel response selected from the temperature response curve. This results in a calibrated raw difference cube which can be used to more accurately determine if a gas of interest is present at a location using HSI data from an HSI sensor.

Figure 3:
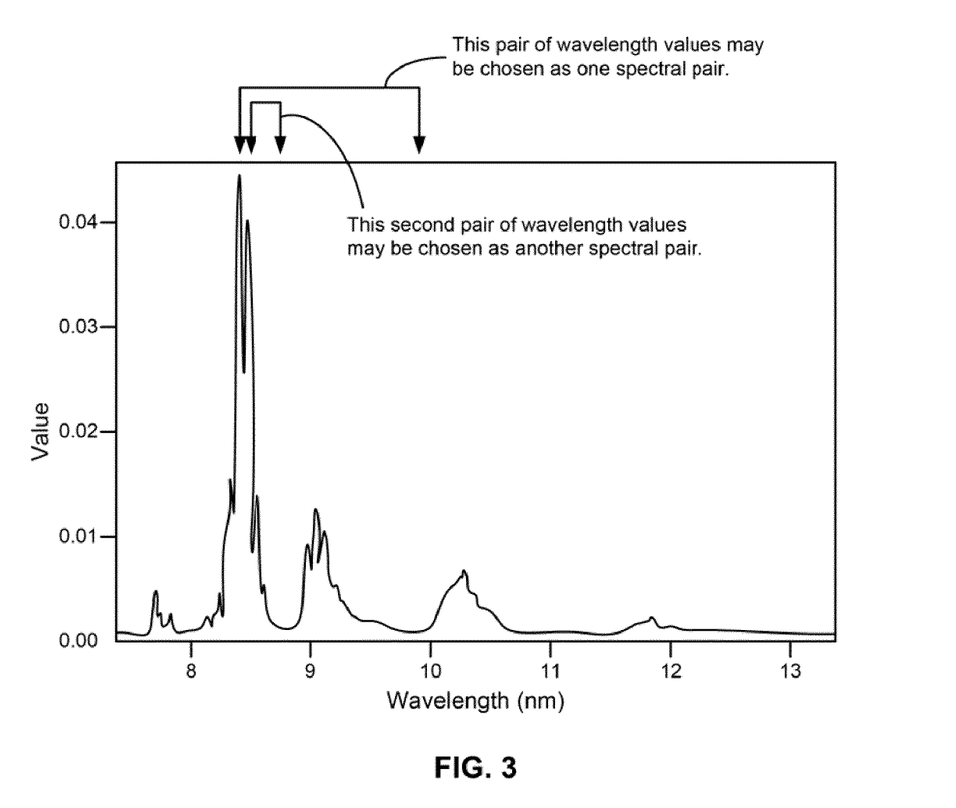
FIG. 3 is a spectral plot of a desired gas according to one example.

In operation 210, at least one desired spectral band is selected based on a gas of interest. In some embodiments, selecting at least one desired spectral band may include selecting a first spectral band that reflects a high absorption wavelength for the gas of interest, and selecting a second band that reflects a low absorption wavelength for the gas of interest. Referring to FIG. 3, a Spectral Plot for a desired gas, taken from a library having spectral plots for many gases, it can be seen that a gas may absorb light at certain light wavelengths better than at other light wavelengths. It is preferable to select peak and valley wavelengths that correspond to the strongest peaks and lowest valleys, and that the peak and valley wavelengths are relatively close to each other, and that the wavelengths are located near the middle of the spectrum range for the HSI sensor, but the peak and valley wavelengths chosen are not limited to only these types.

In some embodiments, more than one gas of interest may be desired, and therefore multiple spectral bands may be chosen, such as one spectral band for each desired gas, two spectral bands for each desired gas, 6 spectral bands for each desired gas, etc. As the amount of spectral bands that are chosen increases, the amount of calculations to arrive at a result increases as well. Therefore, it is advantageous to find a point at which there are diminishing returns on the amount of spectral bands chosen.

Figure 4:
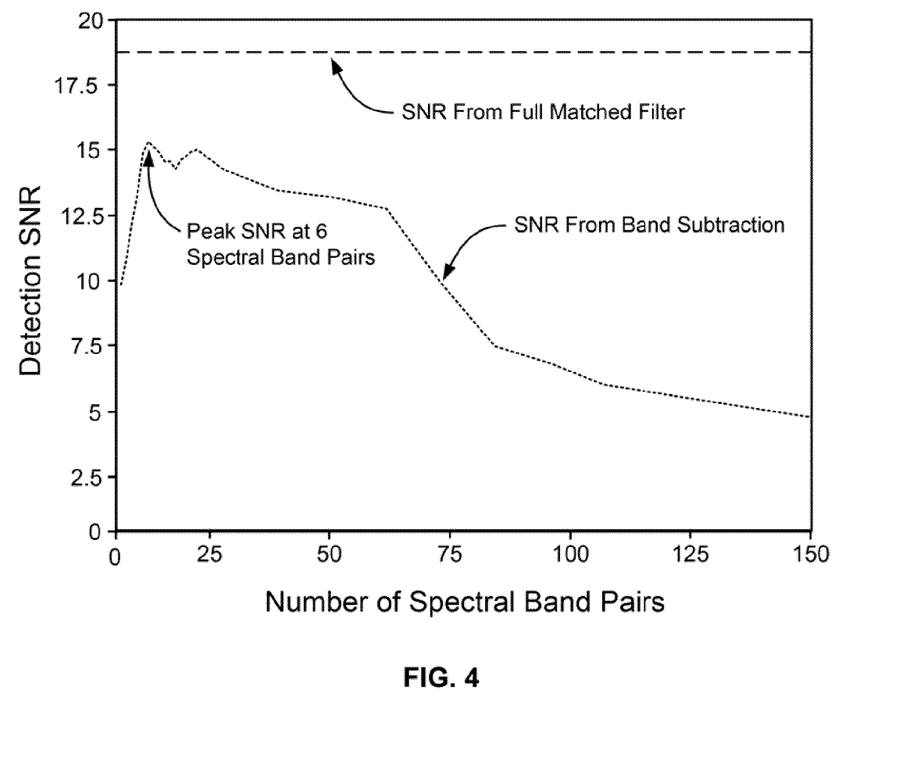
FIG. 4 is a plot of Detection Signal-to-Noise Ratio (SNR) versus the number of paired spectral bands according to one embodiment.

Now referring to FIG. 4, a plot of Detection Signal-To-Noise Ratio (SNR) versus Number of Band Pairs, the number of spectral band pairs (peak and valley) which can be used is discussed. From experimentation, it appears that the point of diminishing returns falls at which using more spectral band pairs does not provide greater detection is at 6 spectral band pairs, as after this point, the detection SNR begins to drop. However, some approaches may use more or less than 6 spectral band pairs.

In operation 212 (FIG. 2), a detection image is produced based on the at least one selected spectral band and the calibrated raw difference cube. The detection image may resemble a photo of the location taken from the perspective of the HSI sensor, with the gas of interest highlighted in some way, for example in a different color, with a callout bubble, by an outline, etc.

In even more approaches, producing a detection image may comprise subtracting on a pixel-by-pixel basis the high absorption wavelength pixel value from the low absorption wavelength pixel value.

In operation 214, the detection image is examined to determine presence of the gas of interest. Examination may be performed by any technique known in the art, such as determining changes in pixel values on a pixel-by-pixel basis, comparing the detection image with previous detection images to determine a difference, indicating a gas' presence, etc.

In some preferred embodiments, examining the detection image may comprise determining on a pixel-by-pixel basis positive and negative pixel values with an absolute value greater than a predetermined threshold value, wherein the positive pixel values indicate an increase in a level of the gas of interest, and wherein the negative pixel values indicate a decrease in a level of the gas of interest between the first time and the second time.

The threshold value may be set to include many gas indications (a low threshold) or may be set to exclude many gas indications (a high threshold). In addition, the threshold may be automatically calculated, such as by averaging the pixel values across all scenes, determining a mean of the pixel values on a scene-by-scene basis, determining a median of the pixel values for each scene, etc.

In operation 216, a result of the examination is output, e.g., in electronic, physical (e.g., ink on paper), visual, etc., form. According to some embodiments, the outputting may further comprise displaying the detection image. For example, the detection image may be displayed on a monitor or computer screen, possibly at a remote location, such that an operator may review the detection image to double-check lithe examination is correct. In other approaches, the result may be output as an indication of presence of the gas. In further approaches, the output is data that may be stored, transmitted, used to generate further output, etc.

According to some approaches, the method 200 may further comprise calibrating the HSI sensor prior to producing the first HSI data cube. The HSI sensor may be more sensitive in certain spectral ranges; therefore, to avoid influencing and possibly corrupting a detection image, the HSI sensor may be calibrated prior to producing data cubes such that the individual sensor sensitivities can be accounted for. In some approaches, calibrating the HSI sensor may include: determining a number of detector counts for each pixel of the HSI sensor for each degree in temperature, and creating a temperature response curve for the HSI sensor based at least in part on the number of detector counts for each degree in temperature. For example, the temperature curve may be similar to that shown in FIG. 5. This allows for this temperature curve to be used to calibrate any data cubes which are subsequently taken by the HSI sensor, since the sensitivity of the sensor at each wavelength is known, and can be used to normalize the data cubes produced.

Figure 5:
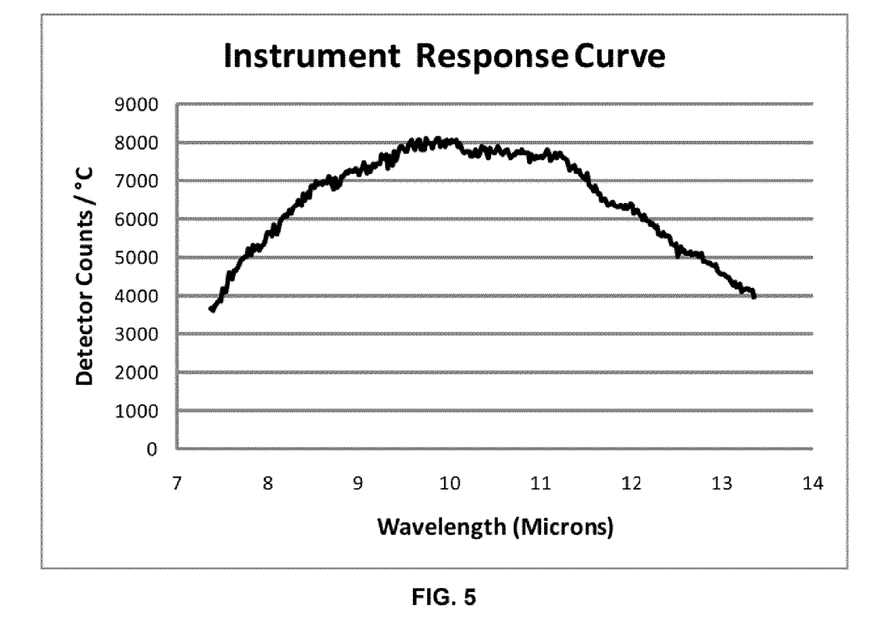
FIG. 5 is a temperature response curve for a HSI sensor according to one example.

The temperature curve shown in FIG. 5 is for illustrative purposes only, and is not meant to be limiting in any way on the methods and systems described herein. Other representations of sensor sensitivities may also be used, and a plot of this type is not the only method of calibrating the HSI sensor prior to use. However, this method of calibrating the HSI sensor has an advantage in that it uses a very few number of calculations with which to provide a calibration for the sensor.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Of course, the methods and techniques described herein may be implemented in a system and/or computer program product. A system may include a processor and a memory operatively coupled to the processor.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a physical computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory, semiconductor memory (e.g., FLASH memory and other portable memory cards, etc.), etc.

The methods described herein may be used with ground-based HSI sensors with limited power supplies to provide in-situ data processing. The methods and systems described herein, according to some embodiments, allow the HSI sensor to process raw HSI data with a low power central processing unit (CPU), field-programmable gate array (FPGA), application specific integrated circuit (ASIC), or some other processor, resulting in gas plume detection information and data volume reduction, all while consuming less power than conventional systems and methods.

In addition, since calculations may be performed by a unit in the field, the unit may be able to send back a limited amount of information to a remote location, thereby saving on transmission energy expenditures, and allowing for transmission to occur over a transmission medium that allows for less information. Also, the unit may be able to transmit only information that is important as determined by a first examination using the methods described herein, thereby allowing for a second, more robust examination at a remote location which has more processing power.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
producing a first hyperspectral imaging (HSI) data cube of a location at a first time using data from a HSI sensor;
producing a second HSI data cube of the same location at a second time using data from the HSI sensor;
subtracting on a pixel-by-pixel basis the second HSI data cube from the first HSI data cube to produce a raw difference cube;
calibrating the raw difference cube to produce a calibrated raw difference cube;
selecting at least one desired spectral band based on a gas of interest;
producing a detection image based on the at least one selected spectral band and the calibrated raw difference cube;
examining the detection image to determine presence of the gas of interest; and
outputting a result of the examination.

2. A method according to claim 1, wherein the outputting further comprises displaying the detection image.

3. A method according to claim 1, further comprising calibrating the HSI sensor prior to producing the first HSI data cube.

4. A method according to claim 3, wherein calibrating the HSI sensor comprises:
determining a number of detector counts for each pixel of the HSI sensor for each degree in temperature; and
creating a temperature response curve for the HSI sensor based at least in part on the number of detector counts for each degree in temperature.

5. A method according to claim 4, wherein calibrating the raw difference cube comprises dividing the raw difference cube on a pixel-by-pixel basis by a measured pixel response selected from the temperature response curve.

6. A method according to claim 1, wherein the selecting at least one desired spectral band further comprises:
- selecting a first spectral band that reflects a high absorption wavelength for the gas of interest; and
- selecting a second band that reflects a low absorption wavelength for the gas of interest.

7. A method according to claim 6, wherein producing a detection image comprises subtracting on a pixel-by-pixel basis the high absorption wavelength pixel value from the low absorption wavelength pixel value.

8. A method according to claim 1, wherein examining the detection image comprises determining on a pixel-by-pixel basis positive and negative pixel values with an absolute value greater than a predetermined threshold value, wherein the positive pixel values indicate an increase in a level of the gas of interest, and wherein the negative pixel values indicate a decrease in a level of the gas of interest between the first time and the second time.

9. A computer program product for detecting the presence of a gas of interest, the computer program product comprising:
- a computer readable memory having computer readable program code stored therein, the computer readable program code comprising:
  - computer readable program code for producing a first hyperspectral imaging (HSI) data cube of a location at a first time using data from a HSI sensor;
  - computer readable program code for producing a second HSI data cube of the same location at a second time using data from the HSI sensor;
  - computer readable program code for subtracting on a pixel-by-pixel basis the second HSI data cube from the first HSI data cube to produce a raw difference cube;
  - computer readable program code for calibrating the raw difference cube to produce a calibrated raw difference cube;
  - computer readable program code for selecting at least one desired spectral band based on a gas of interest;
  - computer readable program code for producing a detection image based on the at least one selected spectral band and the calibrated raw difference cube;
  - computer readable program code for examining the detection image to determine presence of the gas of interest; and
  - computer readable program code for outputting a result of the examination.

10. The computer program product of claim 9, wherein the computer readable program code for outputting comprises readable program code for displaying the detection image.

11. The computer program product of claim 9, wherein the computer readable program code further comprises computer readable program code for calibrating the HSI sensor prior to producing the first HSI data cube.

12. The computer program product of claim 11, wherein the computer readable program code for calibrating the HSI sensor comprises:
- computer readable program code for determining a number of detector counts for each pixel of the HSI sensor for each degree in temperature; and
- computer readable program code for creating a temperature response curve for the HSI sensor based at least in part on the number of detector counts for each degree in temperature.

13. The computer program product of claim 11, wherein the computer readable program code for calibrating the raw difference cube comprises computer readable program code for dividing the raw difference cube on a pixel-by-pixel basis by a measured pixel response selected from the temperature response curve.

14. The computer program product of claim 9, wherein the computer readable program code for selecting at least one desired spectral band further comprises:
- computer readable program code for selecting a first spectral band that reflects a high absorption wavelength for the gas of interest; and
- computer readable program code for selecting a second band that reflects a low absorption wavelength for the gas of interest.

15. The computer program product of claim 14, wherein the computer readable program code for producing a detection image comprises computer readable program code for subtracting on a pixel-by-pixel basis the high absorption wavelength pixel value from the low absorption wavelength pixel value.

16. The computer program product of claim 9, wherein the computer readable program code for examining the detection image comprises computer readable program code for determining on a pixel-by-pixel basis positive and negative pixel values with an absolute value greater than a predetermined threshold value, wherein the positive pixel values indicate an increase in a level of the gas of interest, and wherein the negative pixel values indicate a decrease in a level of the gas of interest between the first time and the second time.

17. A system, comprising:
- a receiving mechanism for receiving a first hyperspectral imaging (HSI) data cube of a location at a first time and a second HSI data cube of the same location at a second time created using data from a HSI sensor;
- a processor; and
- a memory operatively coupled to the processor;
- wherein the processor comprises:
  - logic for subtracting on a pixel-by-pixel basis the second HSI data cube from the first HSI data cube to produce a raw difference cube;
  - logic for calibrating the raw difference cube to produce a calibrated raw difference cube;
  - logic for selecting at least one desired spectral band based on a gas of interest;
  - logic for producing a detection image based on the at least one selected spectral band and the calibrated raw difference cube;
  - logic for examining the detection image to determine presence of the gas of interest; and
  - logic for outputting a result of the examination.

18. The system of claim 17, wherein the logic for outputting further comprises displaying the detection image.

19. The system of claim 17, wherein the processor further comprises logic for calibrating the HSI sensor prior to producing the first HSI data cube.

20. The system of claim 19, wherein the logic for calibrating the HSI sensor comprises:
- logic for determining a number of detector counts for each pixel of the HSI sensor for each degree in temperature; and
- logic for creating a temperature response curve for the HSI sensor based at least in part on the number of detector counts for each degree in temperature.

21. The system of claim 20, wherein the logic for calibrating the raw difference cube comprises logic for dividing the raw difference cube on a pixel-by-pixel basis by a measured pixel response selected from the temperature response curve.

22. The system of claim 17, wherein the logic for selecting at least one desired spectral band further comprises:
> logic for selecting a first spectral band that reflects a high absorption wavelength for the gas of interest; and
> logic for selecting a second band that reflects a low absorption wavelength for the gas of interest.

23. The system of claim 22, wherein the logic for producing a detection image comprises logic for subtracting on a pixel-by-pixel basis the high absorption wavelength pixel value from the low absorption wavelength pixel value.

24. The system of claim 17, wherein the logic for examining the detection image comprises logic for determining on a pixel-by-pixel basis positive and negative pixel values with an absolute value greater than a predetermined threshold value, wherein the positive pixel values indicate an increase in a level of the gas of interest, and wherein the negative pixel values indicate a decrease in a level of the gas of interest between the first time and the second time.

* * * * *